United States Patent
Ellis et al.

(10) Patent No.: US 10,564,056 B2
(45) Date of Patent: *Feb. 18, 2020

(54) SURFACE FORCE APPARATUS BASED ON A SPHERICAL LENS

(71) Applicant: INTERNATIONAL BUSINESS MACHINES CORPORATION, Armonk, NY (US)

(72) Inventors: Arthur W. Ellis, Pleasantville, NY (US); Richard A. Haight, Mahopac, NY (US); James B. Hannon, Lake Lincolndale, NY (US); Rudolf M. Tromp, North Salem, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/104,580

(22) Filed: Aug. 17, 2018

(65) Prior Publication Data

US 2018/0356305 A1 Dec. 13, 2018

Related U.S. Application Data

(63) Continuation of application No. 15/445,019, filed on Feb. 28, 2017, now Pat. No. 10,101,224, which is a continuation of application No. 14/850,146, filed on Sep. 10, 2015, now Pat. No. 9,625,331.

(51) Int. Cl.
*G01B 11/16* (2006.01)
*G01L 1/24* (2006.01)

(52) U.S. Cl.
CPC ............... *G01L 1/24* (2013.01); *G01B 11/161* (2013.01)

(58) Field of Classification Search
CPC .......... G01B 9/02049; G01J 9/02; G01L 1/00
See application file for complete search history.

(56) References Cited

U.S. PATENT DOCUMENTS

| | | |
|---|---|---|
| 5,280,340 A | 1/1994 | Lacey |
| 5,345,815 A | 9/1994 | Albrecht et al. |
| 5,457,534 A | 10/1995 | Lacey et al. |
| 5,953,125 A | 9/1999 | De Groot |
| 6,718,821 B1 | 4/2004 | Houston et al. |
| 8,479,310 B2 | 7/2013 | Humphris |
| 9,625,331 B2 * | 4/2017 | Ellis ................ G01B 11/161 |

(Continued)

OTHER PUBLICATIONS

List of IBM Patents or Patent Applications Treated as Related dated Aug. 17, 2018, 2 pages.

(Continued)

*Primary Examiner* — Jonathan M Hansen
(74) *Attorney, Agent, or Firm* — Tutunjian & Bitetto, P.C.; Vazken Alexanian

(57) ABSTRACT

A force detector and method for using the same includes a lens. A cantilever is disposed below the movable lens. A laser is disposed above the movable lens and is configured to emit a beam of light that reflects from a surface of the lens and the cantilever. A processor is configured to determine a force between the movable lens and the cantilever based on a change in phase in images produced by the light reflected from the spherical surface and the light reflected from the cantilever.

18 Claims, 3 Drawing Sheets

(56) References Cited

U.S. PATENT DOCUMENTS 10,101,224 B2 * 10/2018 Ellis .......................... G01L 1/24

OTHER PUBLICATIONS

Derjaguin et al., "Direct Measurements of Molecular Attraction of Solids", J. Phys. Chem. Solids, vol. 5, 1958, pp. 1-10. **Pursuant to MPEP 609.04(a)(l), the year of this publication is sufficiently earlier than the effective U.S. filing date and any foreign priority date so the particular month of publication is not in issue.
Derjaguin et al., "Direct Measurement of Molecular Forces", Nature, vol. 272, Mar. 1978, pp. 313-318.
Ducker et al., "Measurement of Forces in Liquids Using a Force Microscope", Langmuir, vol. 8, No. 7, Jul. 1992, pp. 1831-1836.
Tabor et al., "The Direct Measurement of Normal and Retarded van der Waals Forces", Proc. R. Soc. Lond., Sep. 1969, vol. 312, pp. 435-450.

* cited by examiner

SURFACE FORCE APPARATUS BASED ON A SPHERICAL LENS

BACKGROUND

Technical Field

The present invention relates to surface force apparatuses and, more particularly, to surface force apparatuses using a spherical lens and Newton's Rings to measure deflection.

Description of the Related Art

Measuring the force of attraction, or adhesion, between two surfaces is a general problem in materials science. Experimentally, measuring the interaction between planar surfaces is challenging because the surfaces need to be perfectly parallel. To get around this difficulty, many measurement techniques use curved surfaces rather than planar ones. For example, crossed cylinders, or a ball and a flat surface may be used to simplify positioning. If the surfaces are smooth and if the radii of curvature are known, the force of interaction measured using curved surfaces can be related to that of two flat surfaces using, e.g., the Derjaguin Approximation.

The crossed cylinder method is used because precise alignment of the cylinder axes is not needed. The main drawback of this approach is that special samples are needed. The samples must be thin (e.g., 1-2 µm) in order to be sufficiently flexible, and they must be transparent because the separation between the surfaces is measured using optical techniques. In practice, mica is the most widely used substrate. If one is interested in other materials, those materials must be grown or deposited onto the mica surfaces.

Another common technique makes use of a flat surface and a spherical surface. The spherical surface is usually a small silica ball with a radius of only a few microns. The ball is attached to the cantilever of an Atomic Force Microscope (AFM). The AFM is used to measure the force between the ball and a macroscopic, flat surface. The main drawback of this approach is that it is difficult to characterize the chemical and physical state of the ball. For example, it is difficult to determine if the ball is smooth or clean at such small sizes.

SUMMARY

A force detector includes a lens. A cantilever is disposed below the movable lens. A laser is disposed above the movable lens and is configured to emit a beam of light that reflects from a surface of the lens and the cantilever. A processor is configured to determine a force between the movable lens and the cantilever based on a change in phase in images produced by the light reflected from the spherical surface and the light reflected from the cantilever.

A method for force detection includes emitting a laser beam such that light reflects from a surface of a lens and a cantilever positioned below the lens. A force between the lens and the cantilever is determined with a processor based on a change in a phase in images produced by the light reflected from the spherical surface and the light reflected from the cantilever.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention employ surface force apparatuses that include a spherical surface and a planar cantilever. According to the present embodiments, the spherical surface is a macroscopic lens. In contrast to the spheres used in atomic force microscopy (AFM), the spherical lens of the present embodiments is easy to characterize using conventional microscopy and spectroscopy. A laser is directed through the surface of the spherical lens and reflected off the planar cantilever. The light reflected by the cantilever interferes with light reflected from the inner surface of the lens, creating a Newton's Rings interference pattern that is used to determine the distance of the cantilever from the surface.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 1:
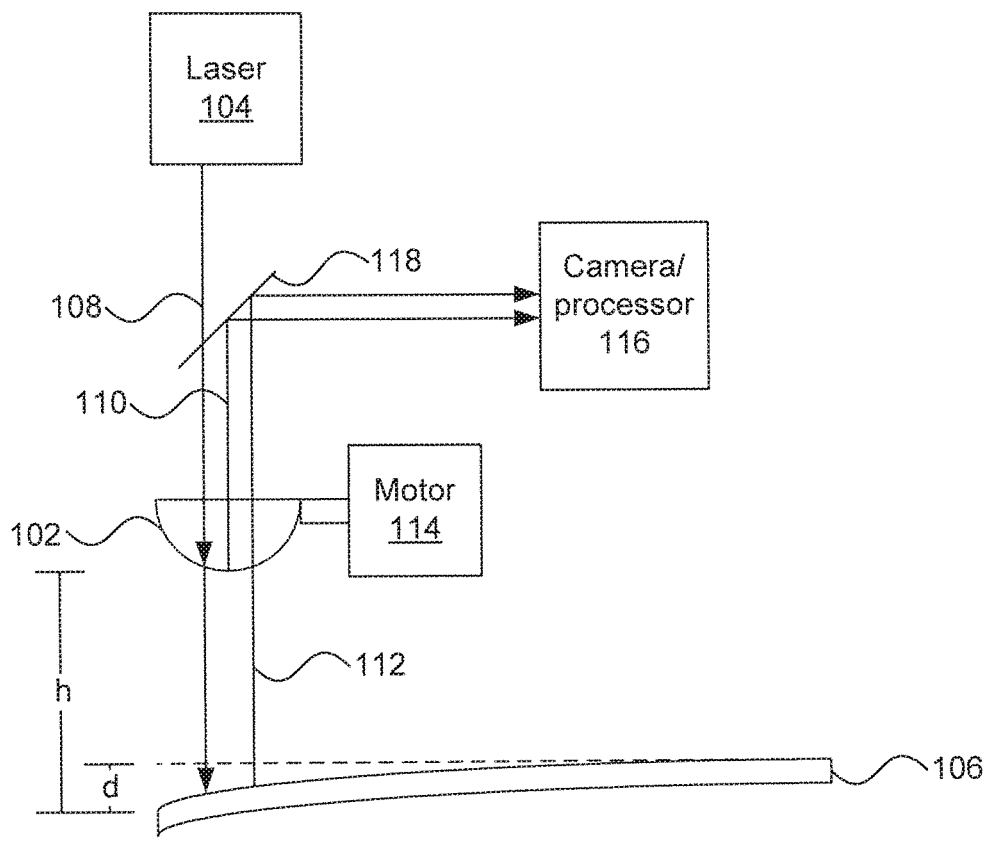
FIG. 1 is a diagram of a surface force measurement apparatus in accordance with the present principles.

Referring now to the drawings in which like numerals represent the same or similar elements and initially to FIG. 1, a surface force apparatus (SFA) is shown. A spherical lens 102 is mounted to a motor 114 with nanoscale positioning capability. The motor 114 positions the lens 102 relative to a planar cantilever 106, and interactions between the surface of the lens 102 and the cantilever 106 cause a force that results in a deflection of the cantilever 106. This deflection is measured as d.

The lens 102 can be formed from any suitable transparent material having a sufficiently small surface roughness. An exemplary surface roughness for the present embodiments is less than about 2 nm root-mean-squared. In one particular embodiment, a fused-silica lens may be employed. The lens 102 may also be coated with a second material, provided that the material is thin and sufficiently transparent. In one exemplary embodiment, the lens 102 may have a surface coating of indium tin oxide or hafnium oxide that is about 2 nm thick. Providing such a coating on the surface of the lens 102 allows for measurement of forces between the surface material and the cantilever 106.

The cantilever 106 may be formed from, for example, an oxidized silicon wafer. The thickness of the cantilever 106 should be small enough to allow for a reasonably measurable deflection. In one exemplary embodiment, the cantilever 106 may have a thickness between about 100 μm and about 700 μm. As above, the cantilever 106 may be coated with a second material to test the second material's interaction with the lens 102. In exemplary embodiments, the cantilever 106 may be coated with silicon oxide or hafnium oxide. The lens 102 and the cantilever 106 may be in any suitable transparent medium including, e.g., air, water, or a vacuum.

A laser 104 generates a beam of light 108 that is directed downward through the lens 102. Some of the laser light 108 continues downward to the surface of the cantilever 106 and some reflects at the surface of the lens 102, to produce reflected light 110 in the reverse direction. The downward laser 108 reflects off the cantilever 106 to produce reflected light 112 that re-enters the lens 102. The two reflected beams 110 and 112 interfere to produce Newton's Rings. The two beams are redirected using a beam splitter 118 toward a camera/processor 116, which captures an image of the interference rings and measures changes in the distance, h, between the lens 102 and the cantilever 106. Using this distance change and the position of the lens 102, an amount of deflection can be determined that corresponds to a force between the lens 102 and the cantilever 106.

In this exemplary embodiment, the spherical lens 102 may be relatively large (e.g., about 1-2 cm) and the cantilever 106 may be relatively thick (e.g., 100-200 μm). In one specific embodiment, a silica lens may be used having a curvature radius of 12.9 nm. This may be compared to the size of a sphere in AFM that may be, for example, 2.5 μm. The cantilever 106 in this specific embodiment may be about 6 cm by about 1 cm and may be formed from a relatively stiff material, such as silicon.

It should be noted that a spherical lens 102 on the centimeter scale can be made very smooth, having an exemplary roughness of less than about 2 nm. The cantilever 106, meanwhile, can be readily calibrated by measuring the deflection of the cantilever 106 with a known mass, determining the resonant frequency, and/or by calculation from known elastic constants.

Figure 2:
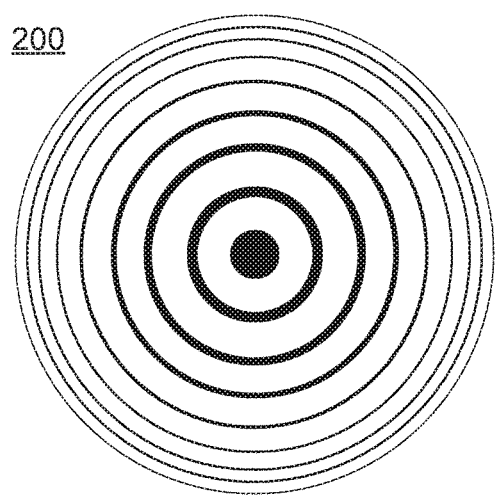
FIG. 2 is a diagram of a Newton's Rings interference pattern produced in accordance with the present principles.

Referring now to FIG. 2, an example of a Newton's Rings interference pattern 200 is shown. Newton's Rings are characterized by alternating bright and dark rings that correspond to constructive and destructive interference between the reflected beams 110 and 112. The outer rings of the pattern are spaced more closely together than the inner rings and there is a large spot, bright or dark, in the middle. The bright rings of constructive interference are periodic with the ring's radius squared, such that the rings get closer together as the radius increases. The ring pattern 200 can be captured using a commercial digital camera and analyzed automatically using a computer.

Figure 3:
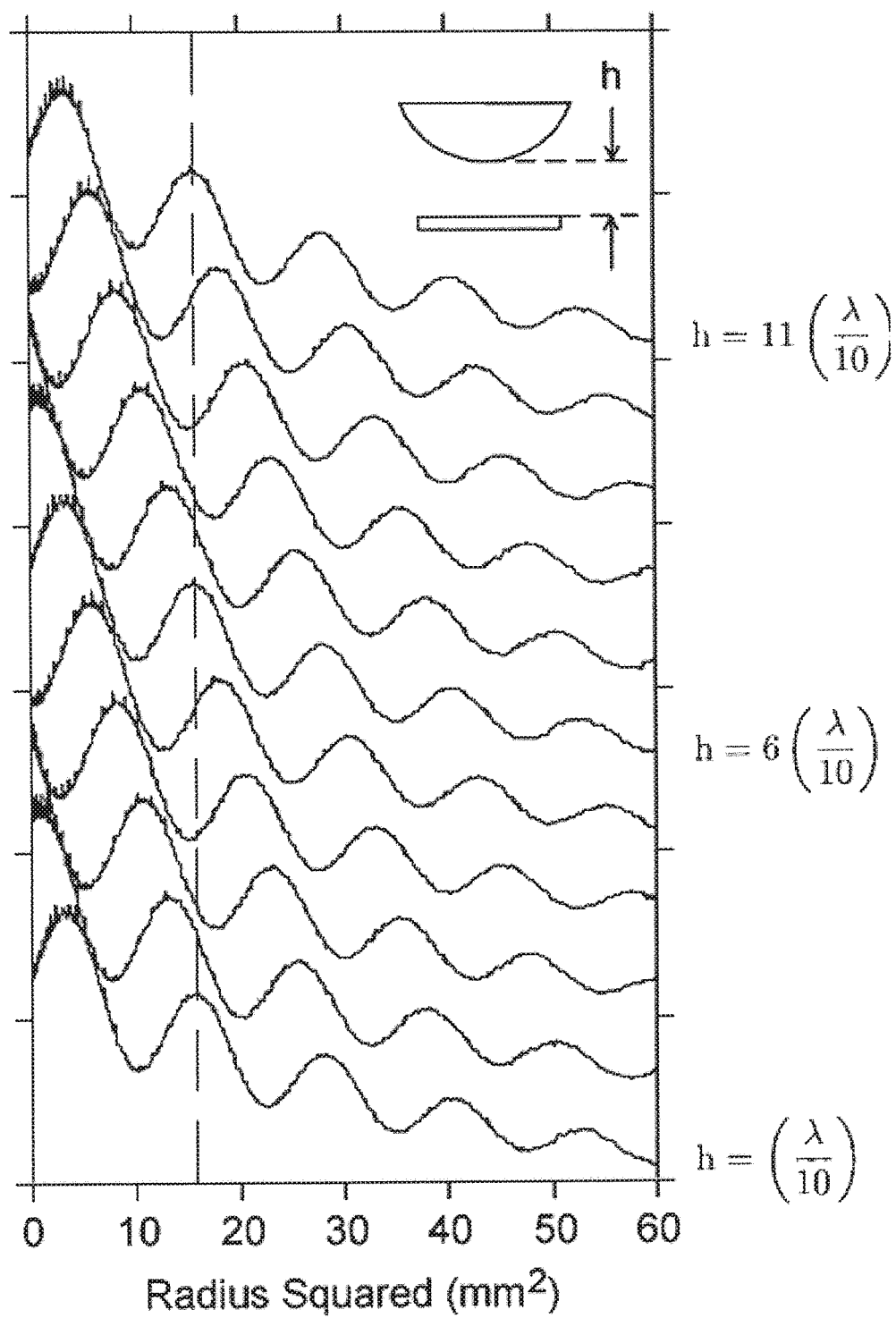
FIG. 3 is a diagram showing the change of ring phase in the interference pattern corresponding with the change in distance between a lens and a cantilever in accordance with the present principles.

Referring now to FIG. 3, the locations of maxima are shown relative to the height h shown in FIG. 1. As the height h changes (shown here as being proportional to the wavelength of the beam 108), the relative phase of the interfering beams of light changes, causing the locations of the rings' maxima to change. By measuring the position of the rings, one can determine an accurate measurement of the change in height between the lens 102 and the cantilever 106. A change in height h can be determined by measuring a change in phase, $$\Delta h = \frac{\Delta p}{2\pi}\left(\frac{\lambda}{2n_0}\right),$$

where $\Delta p$ is the phase change, $\lambda$ is the wavelength, and $n_0$ is the index of refraction of the medium between the surface of the lens 102 and the cantilever 106. For example, moving from a peak to a trough in FIG. 3 would represent a phase change of $\pi$ that corresponds to a specific change in height. To account for changes that cross multiple cycles, a counter may be incremented each time the phase change reaches $2\pi$. Alternatively, the motion of a single peak may be tracked across multiple cycles of phase change. This analysis of the ring pattern 200 can determine the distance between the surfaces of the lens 102 and the cantilever 106 to an exemplary resolution of about 10 nm in one embodiment.

As noted above, there are two distances at play: the distance h between the lens and the surface of the cantilever, which is measured using Newton's Rings. Another relevant distance is the distance of deflection of the cantilever, d, which corresponds directly to the force being exerted on the cantilever. This is determined using a known position of the motor 114, z, relative to some calibrated zero point $z_0$ where there is no deflection, and the determined separation of the two surfaces. According to this, $d=(z-z_0)+(h-h_0)$, where $h_0$ is the measured distance between surfaces when z is an initial value $z_0$. A positive value for d indicates that the cantilever 106 has deflected downward, away from the lens 102, while a negative value indicates an upward deflection, toward the lens 102. For example, the interaction between two silicon oxide surfaces in water is repulsive and produces a measurable downward deflection of the cantilever 106. On the other hand, the interaction between silicon dioxide and hafnium oxide in water is attractive and produces a measurable upward deflection.

Once a value for d has been determined, this readily leads to a value for the force exerted on the cantilever surface 106. The force F is determined using a known spring constant k for the cantilever as F=kd. The force between the sphere and the plane can be used to find the interaction energy between the two surfaces as $$W = \frac{F}{2\pi R},$$

where R is the radius of the spherical lens 102. This outcome is valid for any additive force and is not sensitive to the alignment between the sphere and the plane—only the force as measured by the deflection distance d.

Figure 4:
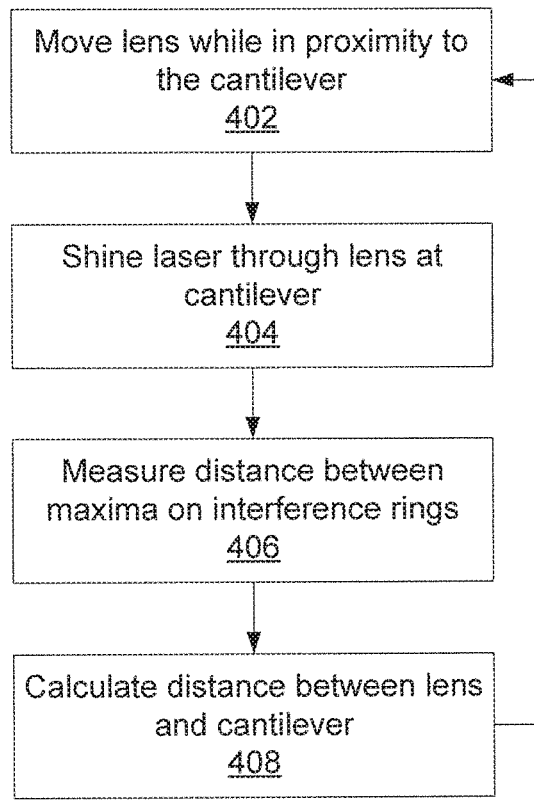
FIG. 4 is a block/flow diagram of a surface force measurement method in accordance with the present principles.

Referring now to FIG. 4, a method for making a force measurement is shown. Block 402 uses motor 114 to move the lens 102 while in proximity with the cantilever 106, keeping track of the change in motor position. Block 404 uses laser 104 to shine a beam of light through the lens 102 toward the cantilever 106. Some of the light will reflect back from the spherical surface of the lens 102, while other light will reflect back from the cantilever 106. Block 406 captures the resulting interference pattern and measures the distance between rings in the interference pattern resulting from the two reflected beams using a camera 116. Block 408 calculates a force between the lens and the cantilever by determining a distance of deflection in the cantilever 106 based on a change in the position of the lens 102 and a change in the distance between the lens 102 and the cantilever 106.

This technique may also be used for adhesion force measurements. To measure an adhesion force, block 402 moves the lens 102 into contact with the cantilever 106 and then begins moving back. The process of FIG. 4 is then repeated, with block 402 moving farther back with each repetition until block 406 measures a drop-off of the force measured. This drop-off represents the cantilever 106 breaking contact with the lens 102. The last force measured before the drop-off then represents the adhesion force between the lens 102 and the cantilever 106.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
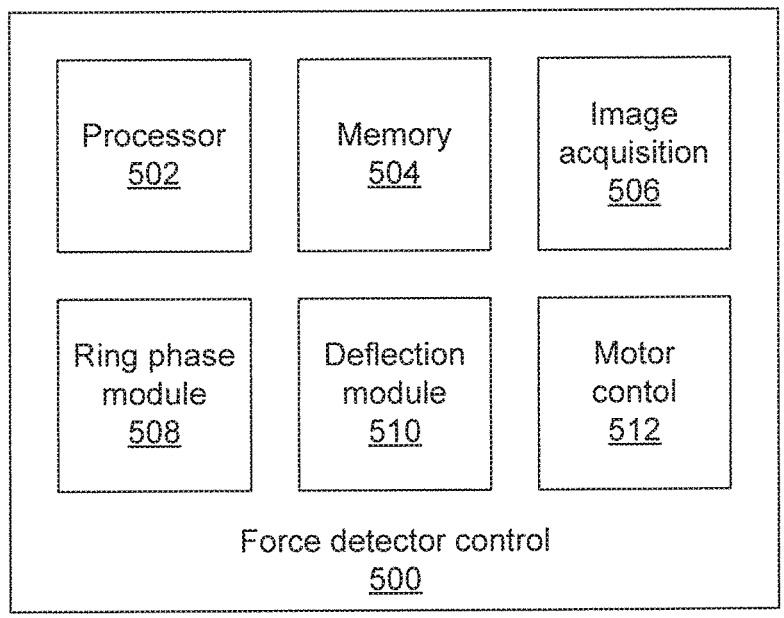
FIG. 5 is a force detector control system in accordance with the present principles.

Referring now to FIG. 5, a force detector control 500 is shown. The control 500 includes a processor 502 and a memory 504 that calculate and store force measurements. An image acquisition module communicates with camera 116, acquires images of the interference rings, and stores the images in memory 504. A ring phase module 508 measures a change in phase of the rings according to a measured distance-squared. Based on the change in phase, a deflection module 510 determines the deflection of the cantilever 106 based on position change information from the motor 114 and a distance between the lens 102 and the cantilever 106 using the measured change in phase. A motor control 512 controls the motor 114 to change the position of the lens 102.

Having described preferred embodiments of a surface force apparatus based on a spherical lens and methods for employing the same (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A force detector, comprising:
   a lens;
   a cantilever disposed below a movable lens;
   a laser disposed above the movable lens configured to emit a beam of light that reflects from a surface of the lens and the cantilever; and
   a processor configured to determine a force between the movable lens and the cantilever based on a change in phase in images produced by the light reflected from the lens surface and the light reflected from the cantilever.

2. The force detector of claim 1, wherein the lens is formed from a lens base material and has a coating on the surface of the lens formed from a first material to be tested.

3. The force detector of claim 1, wherein the cantilever comprises a cantilever base material and has a coating formed from a second material to be tested.

4. The force detector of claim 1, further comprising a motor configured to move the lens and to track changes in lens position.

5. The force detector of claim 1, wherein the processor is further configured to determine a deflection of the cantilever based on a change in lens position and a change in a distance between the lens and the cantilever.

6. The force detector of claim 5, wherein the processor is further configured to determine the change in distance between the lens and the cantilever according to $$\Delta h = \frac{\Delta p}{2\pi}\left(\frac{\lambda}{2n_0}\right),$$

where $\Delta h$ is the change in distance, $\Delta p$ is the change in phase of interference rings in an image, $\lambda$ is the wavelength of the emitted light, and $n_0$ is the index of refraction of the medium between the surface of the lens and the cantilever.

7. The force detector of claim 1, wherein the lens has a spherical surface with a radius of at least 1 cm and a surface roughness of 2 nm or less and wherein the cantilever has a thickness of at least 10 µm.

8. The force detector of claim 1, wherein the lens is in contact with the cantilever and progressively moved away from the cantilever's resting position, such that a force of adhesion causes a deflection in the cantilever and wherein the processor is further configured to repeatedly measure an adhesion force between the lens and the cantilever until the cantilever breaks contact with the lens.

9. The force detector of claim 8, wherein the processor is configured to determine the force of adhesion based on a last measured deflection before the cantilever breaks contact with the lens.

10. A method for force detection, comprising:
    emitting a laser beam such that light reflects from a surface of a lens and a cantilever positioned below the lens;
    determining a force between the lens and the cantilever with a processor based on a change in a phase in images produced by the light reflected from the lens surface and the light reflected from the cantilever.

11. The method of claim 10, wherein the lens is formed from a lens base material and has a coating on a lens surface formed from a first material to be tested.

12. The method of claim 10, wherein the cantilever comprises a cantilever base material and has a coating formed from a second material to be tested.

13. The method of claim 10, further comprising moving the lens according to a known position change.

14. The method of claim 10, wherein determining the force further comprises determining a deflection of the cantilever based on a change in lens position and a change in a distance between the lens and the cantilever.

15. The method of claim 14, wherein determining the force further comprises determining the change in distance between the lens and the cantilever according to $$\Delta h = \frac{\Delta p}{2\pi}\left(\frac{\lambda}{2n_0}\right),$$

where $\Delta h$ is the change in distance, $\Delta p$ is the change in phase of interference rings in the captured image, $\lambda$ is the wavelength of the emitted light, and $n_0$ is the index of refraction of the medium between a surface of the lens and the cantilever.

16. The method of claim 10, wherein the lens has a spherical surface with a radius of at least 1 cm and a surface roughness of 2 nm or less and wherein the cantilever has a thickness of at least 100 µm.

17. The method of claim 10, further comprising:
    moving the lens into contact with the cantilever;
    moving the lens away from the cantilever's resting position, such that a force of adhesion causes a deflection in the cantilever; and repeatedly measuring an adhesion force between the lens and the cantilever until the cantilever breaks contact with the lens.

18. The method of claim 17, wherein measuring the adhesion force comprises retaining a last measured adhesion force based on the deflection before the cantilever breaks contact with the lens.

\* \* \* \* \*